(12) United States Patent
Suzuki et al.

(10) Patent No.: US 11,577,351 B2
(45) Date of Patent: Feb. 14, 2023

(54) POSITION ADJUSTMENT DEVICE AND ULTRAPRECISION MACHINE TOOL

(71) Applicant: FANUC CORPORATION, Minamitsuru-gun (JP)

(72) Inventors: Toyoaki Suzuki, Yamanashi-ken (JP); Masahiro Murota, Yamanashi-ken (JP)

(73) Assignee: FANUC CORPORATION, Yamanashi (JP)

(*) Notice: Subject to any disclaimer, the term of this patent is extended or adjusted under 35 U.S.C. 154(b) by 116 days.

(21) Appl. No.: 16/919,642

(22) Filed: Jul. 2, 2020

(65) Prior Publication Data
US 2021/0016402 A1 Jan. 21, 2021

(30) Foreign Application Priority Data

Jul. 17, 2019 (JP) .............................. JP2019-131738
May 20, 2020 (JP) .............................. JP2020-088289

(51) Int. Cl.
*B23Q 3/18* (2006.01)
*B23B 29/12* (2006.01)

(52) U.S. Cl.
CPC ................ *B23Q 3/18* (2013.01); *B23B 29/12* (2013.01); *B23Q 2716/08* (2013.01)

(58) Field of Classification Search
CPC .......... B23B 29/12; B23Q 3/18; B23Q 3/106; B23Q 3/107; B23Q 3/108

USPC ................................................. 269/309, 610
See application file for complete search history.

(56) References Cited

FOREIGN PATENT DOCUMENTS

CN    105312949 A   *   2/2016   .............. B23Q 3/18
JP    3112302 U        8/2005

OTHER PUBLICATIONS

CN-105312949-A translation (Year: 2016).*

* cited by examiner

*Primary Examiner* — Tyrone V Hall, Jr.
*Assistant Examiner* — Abbie E Quann
(74) *Attorney, Agent, or Firm* — McGinn I.P. Law Group, PLLC.

(57) ABSTRACT

A position adjustment device for adjusting the height of an object to be supported includes: a fixed portion; a movable portion provided to be movable in the height direction relative to the fixed portion and supporting the object to be supported; an expanding and contracting portion coupled to the fixed portion and the movable portion and configured to expand and contract in the height direction; an adjustment mechanism configured to adjust the position of the movable portion in the height direction relative to the fixed portion; and a metal member fixed to the fixed portion and the movable portion.

12 Claims, 13 Drawing Sheets

POSITION ADJUSTMENT DEVICE AND ULTRAPRECISION MACHINE TOOL

CROSS-REFERENCE TO RELATED APPLICATIONS

This application is based upon and claims the benefit of priority from Japanese Patent Applications No. 2019-131738 filed on Jul. 17, 2019, and No. 2020-088289 filed on May 20, 2020, the contents all of which are incorporated herein by reference.

BACKGROUND OF THE INVENTION

Field of the Invention

The present invention relates to a position adjustment device for adjusting at least the height of the position of an object to be supported and to an ultraprecision machine tool.

Description of the Related Art

Japanese Utility Model Registration No. 3112302 discloses a jig that has a lower half 16 to be placed on a worktable, an upper half 15 for supporting an object to be cut, which is an object to be supported, and an arc-shaped connection 17 connecting the lower half 16 and the upper half 15. The jig disclosed is capable of adjusting the position of the object supported on the upper half 15 by adjusting the position of the upper half 15 relative to the lower half 16 with the upper half 15 kept connected to the arc-shaped connection 17.

SUMMARY OF THE INVENTION

In general, devices for adjusting the position of the object to be supported are constructed by coupling a plurality of parts. Such structures are prone to rigidity problems since the load is likely to concentrate on the connections between parts. For example, with the jig disclosed in Japanese Utility Model Registration No. 3112302, suppose that an object to be supported is placed on the upper half 15 after the position of the upper half 15 has been adjusted so as to raise and space the upper half 15 from the lower half 16. Then, the load concentrates on the upper half 15 and the arc-shaped connection 17 and therefore the upper half 15 and the arc-shaped connection 17 are likely to distort. In this case, it is difficult to precisely position the object to be supported, by using the jig disclosed in Japanese Utility Model Registration No. 3112302.

Furthermore, if the object to be supported is a tool, the tool vibrates during machining process. Then, if resonance occurs between the tool and the device supporting the tool, it will deteriorate machining accuracy.

Accordingly, an object of the present invention is to provide a position adjustment device and an ultraprecision machine tool having high rigidity and a superior vibration damping property.

According to an aspect of the present invention, a position adjustment device for adjusting a height of an object to be supported includes: a fixed portion; a movable portion provided to be movable in a height direction relative to the fixed portion and configured to support the object to be supported; an expanding and contracting portion coupled to the fixed portion and the movable portion and configured to expand and contract in the height direction; an adjustment mechanism configured to adjust a position of the movable portion in the height direction relative to the fixed portion; and a metal member fixed to the fixed portion and the movable portion.

According to another aspect of the present invention, an ultraprecision machine tool configured to machine a workpiece according to a command for performing machining of 100 nm or less includes the position adjustment device of the aspect above.

The present invention provides a position adjustment device and an ultraprecision machine tool having high rigidity and a superior vibration damping property.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
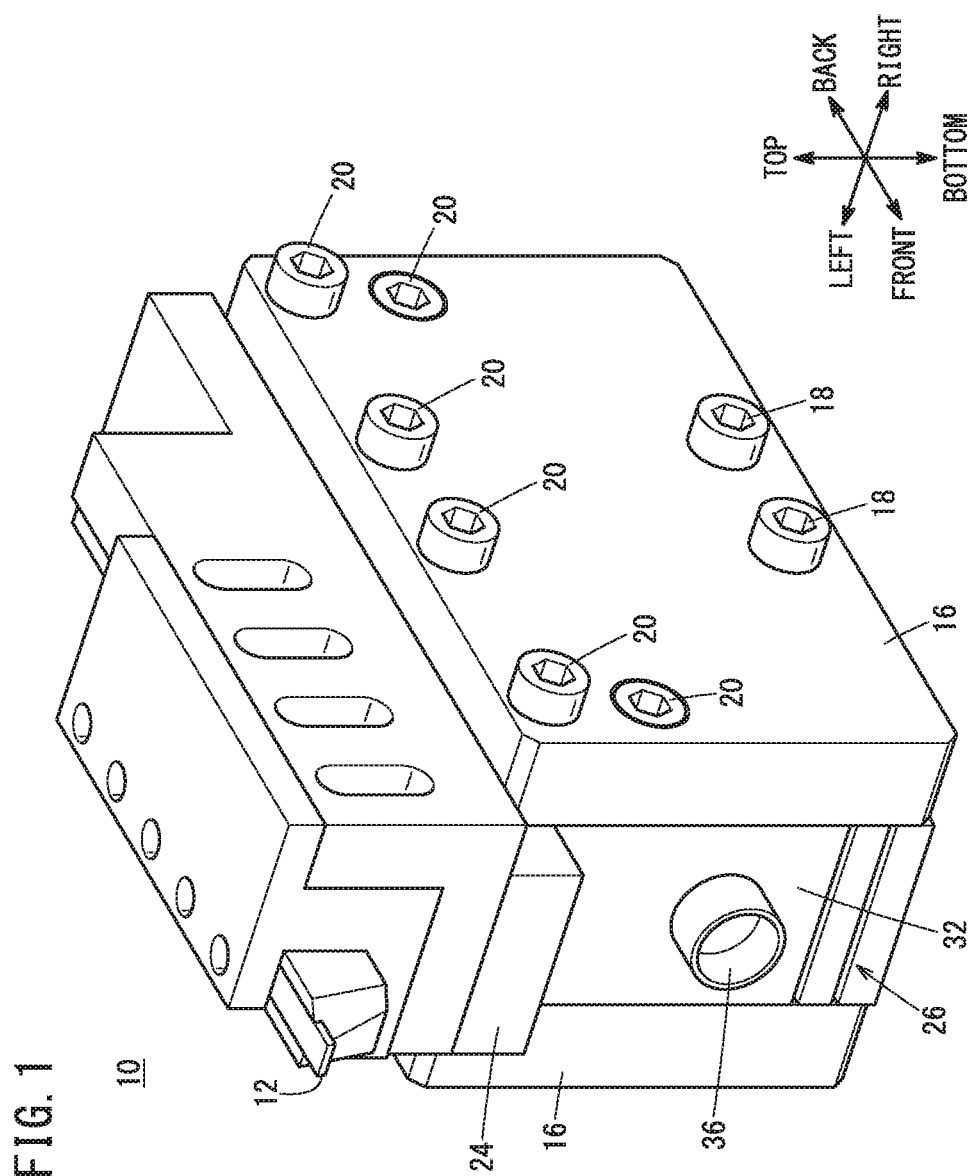
FIG. 1 is a perspective view of a position adjustment device according to a first embodiment.

The position adjustment device and ultraprecision machine tool according to the present invention will now be described in detail in connection with a first preferred embodiment while referring to the accompanying drawings. The directions used in description follow the arrows in the drawings.

First Embodiment

Figure 2:
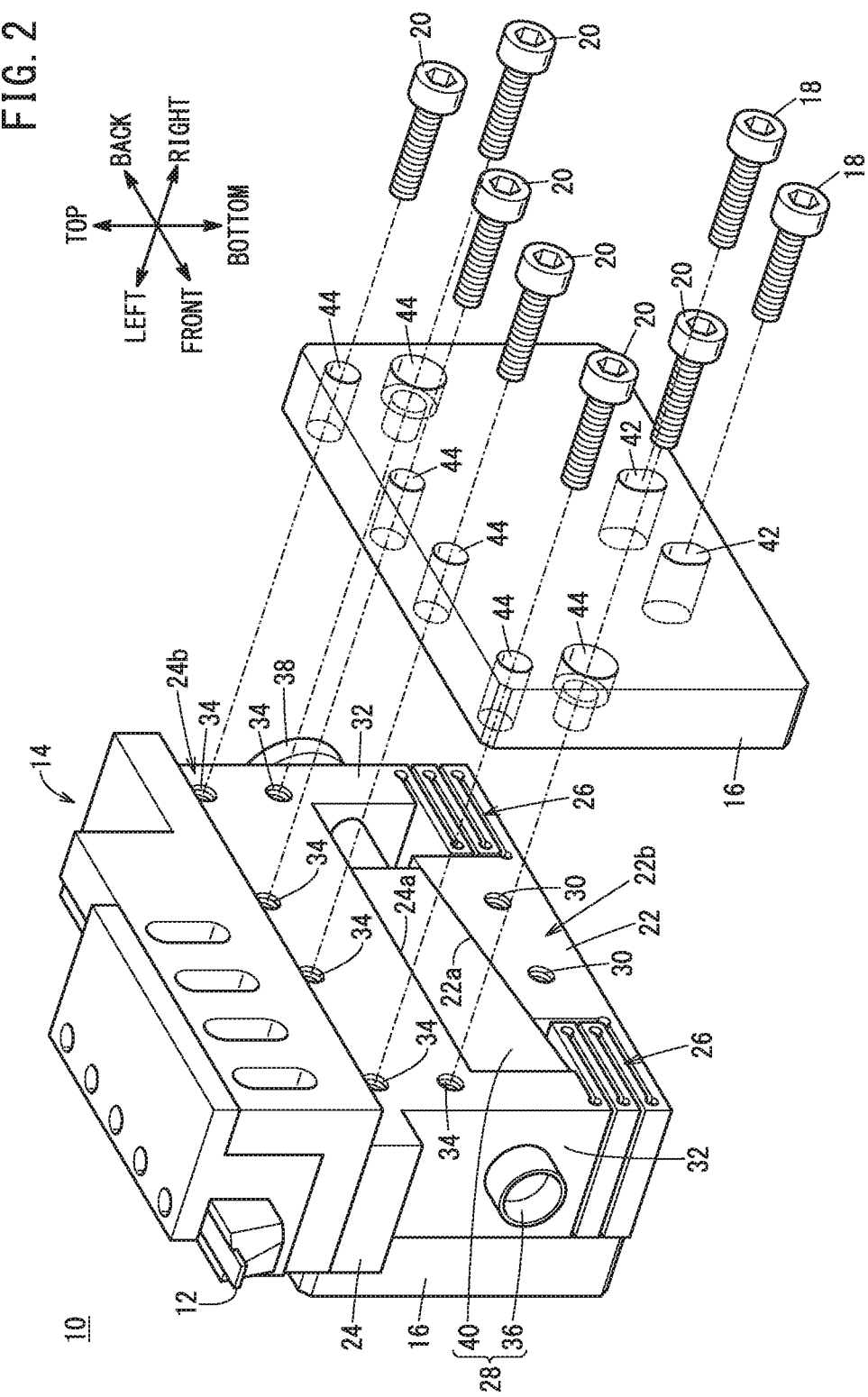
FIG. 2 is an exploded view of the position adjustment device according to the first embodiment.

FIG. 1 is a perspective view of a position adjustment device 10 according to a first embodiment. FIG. 2 is an exploded view of the position adjustment device 10 of the first embodiment.

The position adjustment device 10 is a device configured to adjust the position of an object to be supported (supported target) 12 in at least a height direction (top-bottom direction, up-down direction). The position adjustment device 10 allows the operator to easily maintain the object to be supported 12 at a desired height. The object to be supported 12 is not particularly limited but is assumed to be a tool 12 of a machine tool in this embodiment.

The position adjustment device 10 includes a main body 14 for supporting the tool 12, metal members 16 each having a substantially rectangular plate shape, and first fastening members 18 and second fastening members 20 for fixing (fastening) the main body 14 and the metal members 16 together.

The main body 14 includes a fixed portion 22 that is mounted on a worktable or floor, and a movable portion 24 that is provided to be movable in a height direction relative to the fixed portion 22 and that supports the tool 12. The main body 14 further includes expanding and contracting portions 26 coupled to the fixed portion 22 and the movable portion 24 and capable of expanding and contracting in the height direction, and an adjustment mechanism 28 for adjusting the position of the movable portion 24 relative to the fixed portion 22 in the height direction.

The fixed portion 22 is made of an alloy material, for example. The fixed portion 22 has an inclined surface 22a that is formed on the side facing the movable portion 24 (on the upper side) so as to incline along a depth direction (front-back direction) that is orthogonal to the height direction. The inclined surface 22a of this embodiment (FIG. 2) is inclined upward from the front side to back side. However, this is an exemplary implementation and the inclined surface 22a may be inclined downward from the front side to back side.

First insertion holes 30 are formed in a side surface 22b of the fixed portion 22 that resides on the right side in a width direction (left-right direction) that is orthogonal to the height direction and depth direction. The first insertion holes 30 are shown as circular holes in FIG. 2, but the shape thereof is not particularly limited. Also, FIG. 2 shows "two" first insertion holes 30 but the number of first insertion holes 30 is not particularly limited.

Though not shown graphically, first insertion holes 30 are formed also in the left-hand side surface of the fixed portion 22 in the same manner as in the right-hand side surface 22b.

First through holes 42 formed in the metal members 16, which will be described later, communicate respectively with the first insertion holes 30 formed in the fixed portion 22.

The movable portion 24 is made of the same alloy material as the fixed portion 22, for example. The movable portion 24 supports the tool 12 and is spaced from the fixed portion 22 in the height direction. The movable portion 24 has a lower surface 24a that is a flat plane orthogonal to the height direction in this embodiment. The lower surface 24a faces toward the inclined surface 22a of the fixed portion 22 with the adjustment mechanism 28 interposed therebetween. The movable portion 24 further has legs 32 provided respectively at both ends thereof in the depth direction and extending downward from the lower surface 24a.

In this embodiment, the right-hand side surface 24b of the movable portion 24 including the legs 32 is substantially flush with the side surface 22b of the fixed portion 22. The side surface 24b has formed therein second insertion holes 34. In FIG. 2, the second insertion holes 34 are shown as circular holes, but the shape thereof is not particularly limited. Also, FIG. 2 shows "six" second insertion holes 34 formed in the side surface 24b, but the number of second insertion holes 34 is not particularly limited.

Though not shown graphically, the left-hand side surface of the movable portion 24 including the legs 32 is substantially flush with the left-hand side surface of the fixed portion 22. Further, second insertion holes 34 are formed also in the left-hand side surface of the movable portion 24 in the same way as in the right-hand side surface 24b.

Second through holes 44 formed in the metal member 16, which will be described later, communicate respectively with the second insertion holes 34 formed in the movable portion 24 when the first insertion holes 30 of the fixed portion 22 and the first through holes 42 of the metal member 16 communicate with each other.

In this embodiment, the expanding and contracting portions 26 are crank-shaped members made of the same alloy material as the fixed portion 22 and the movable portion 24. Two expanding and contracting portions 26 are provided respectively at the sides of the fixed portion 22 in the depth direction, with the fixed portion 22 interposed therebetween. Each of the two expanding and contracting portions 26 has its one end integrally coupled (connected) to the fixed portion 22, and its other end integrally coupled (connected) to the leg 32 of the movable portion 24.

The crank-shaped expanding and contracting portions 26, which are connected to the fixed portion 22 and the movable portion 24 and expand and contract in the height direction, can be easily manufactured together with the fixed portion 22 and the movable portion 24 by machining one alloy material with a machine tool, for example. The expanding and contracting portions 26 are not limited to this structure. For example, the expanding and contracting portions 26 may be springs having elasticity. Springs are relatively easily available as parts.

Figure 3:
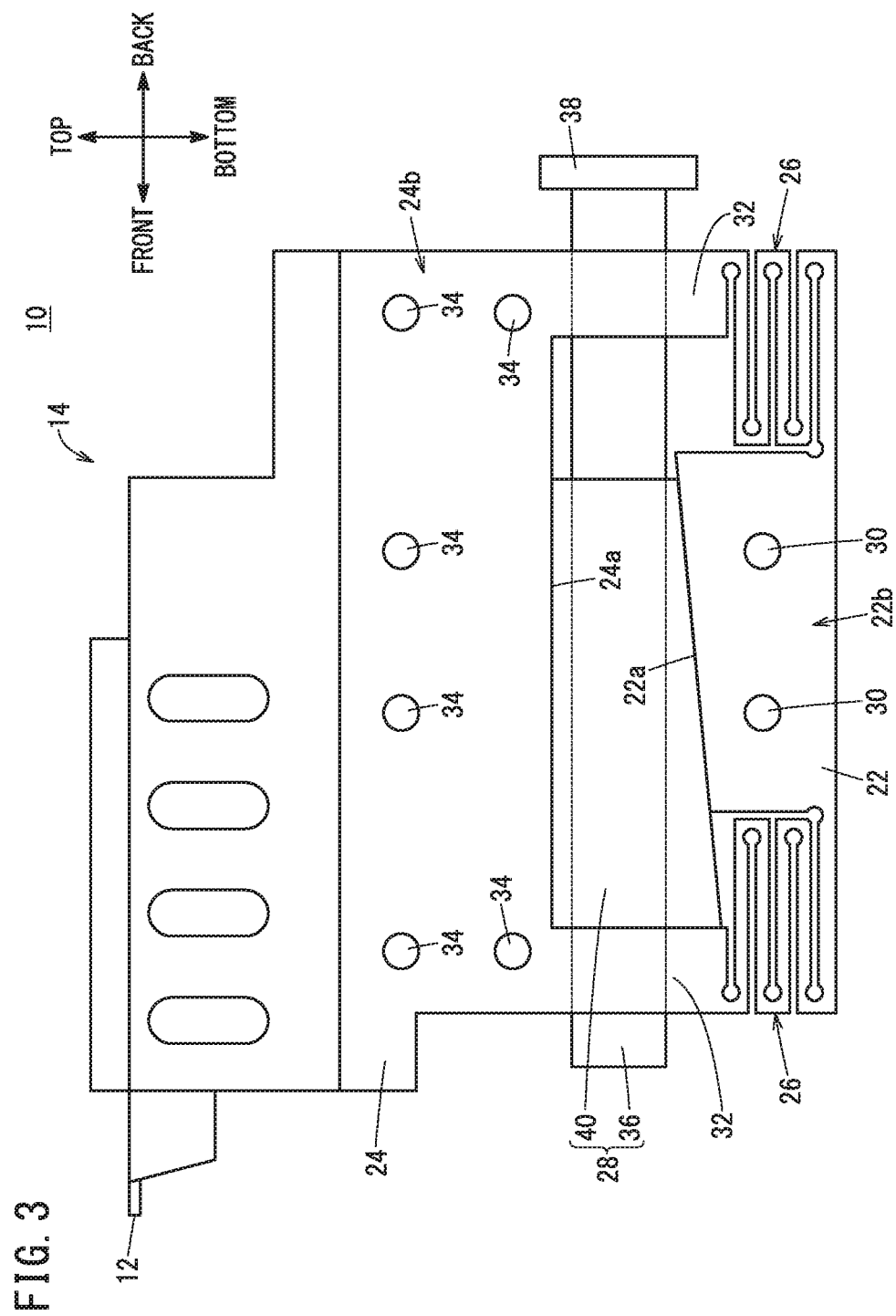
FIG. 3 is a side view of the main body of the position adjustment device of the first embodiment.

FIG. 3 is a side view of the main body 14 of the position adjustment device 10 of the first embodiment. FIG. 3 shows the position adjustment device 10 viewed from the right side.

In this embodiment, the adjustment mechanism 28 is positioned between the fixed portion 22 and the movable portion 24. The adjustment mechanism 28 includes a deflector type ball screw (operated portion) 36 passing (penetrating) through the two legs 32 in the depth direction, and a slide member 40 coupled to the ball screw 36 in such a manner that it slides along the depth directions as the ball screw 36 turns.

The ball screw 36 has a handle (grip portion) 38 provided at its one end in the depth direction, and the handle 38 enables the operator to easily hold the operated portion (ball screw) in order to operate (turn) the ball screw 36. The slide member 40 has a wedge shape that is in contact, in the height direction, with the lower surface 24a of the movable portion 24 and with the inclined surface 22a of the fixed portion 22. The slide member 40 slides in the range between the two legs 32.

The operator can easily adjust the height (vertical position) of the tool 12 supported on the movable portion 24 by operating (turning) the ball screw 36.

For example, suppose that the operator turns the ball screw 36 so as to cause the slide member 40 to slide from the front side to back side. Then, while moving backward, the slide member 40 also gradually moves upward along the inclined surface 22a of the fixed portion 22. Further, the expanding and contracting portions 26, coupled to the fixed portion 22 and the movable portion 24, expand in the height direction. Then, the movable portion 24 is raised by the slide member 40 gradually moving upward, and the movable portion 24 thus moves upward. On the other hand, when the slide member 40 is moved from the back side to front side, the movable portion 24 moves downward as the slide member 40 gradually moves downward while moving frontward. In this case, the expanding and contracting portions 26 contract in the height direction.

The metal members 16 are members that contain at least metal as its material and that are fastened to the main body 14 in order to reinforce damping property and rigidity. The metal members 16 can be manufactured easily since they have simple, substantially rectangular plate shapes.

The material of the metal members 16 preferably contains, but is not limited to, damping alloy. "Damping alloy" means alloys having high vibration damping properties, and manganese-based "M2056 alloy" is known, for example.

In this embodiment, it is assumed that the metal members 16 are made of an iron-based damping alloy. Iron is a material that is easily available and has superior rigidity to manganese.

Each metal member 16 has formed therein the first through holes 42 and second through holes 44 passing (penetrating) through the metal member 16 in the width direction. The first through holes 42 of this embodiment are elongated holes extending in the height direction. The length of the first through holes 42 in the height direction is set to at least the longest length in the height direction that the movable portion 24 moves relative to the fixed portion 22 as the slide member 40 slides. The second through holes 44 of this embodiment are circular holes.

In this embodiment, on the right-hand side, the side surface 22b of the fixed portion 22 and the side surface 24b of the movable portion 24 are substantially flush with each other, and the metal member 16 has a plate shape. Accordingly, the metal member 16 can be in uniform close contact with the fixed portion 22 and the movable portion 24. The same is true on the left-hand side.

At this time, as mentioned earlier, the first through holes 42 communicate respectively with the first insertion holes 30 formed in the fixed portion 22. When there are a plurality of first insertion holes 30 as in this embodiment, the same number of first through holes 42 as the first insertion holes 30 are provided, and the plurality of first through holes 42 communicate respectively with the plurality of first insertion holes 30.

The first fastening members 18 are inserted respectively in the first through holes 42 and the first insertion holes 30 communicating with each other. The first fastening members 18 are bolts or screws, for example. The metal members 16 and the fixed portion 22 are thus fastened together.

As mentioned above, the second through holes 44 communicate respectively with the second insertion holes 34 when the first insertion holes 30 and the first through holes 42 communicate with each other. Also, like the first through holes 42, when there are a plurality of second insertion holes 34, the same number of second through holes 44 as the second insertion holes 34 are provided, and the plurality of second through holes 44 respectively communicate with the plurality of second insertion holes 34.

The second fastening members 20 are inserted respectively in the second through holes 44 and the second insertion holes 34 communicating with each other. Like the first fastening members 18, the second fastening members 20 are bolts or screws, for example. The metal members 16 and the movable portion 24 are thus fastened together.

In this embodiment, the first through holes 42 are elongated holes extending in the height direction. With this configuration, even when the relative positional relation between the fixed portion 22 and the movable portion 24 varies in the height direction, it is possible to maintain the condition in which the first through holes 42 and the first insertion holes 30 communicate with each other and the second through holes 44 and the second insertion holes 34 communicate with each other. Thus, in this embodiment, the fixed portion 22 and the metal members 16 can be fastened together and the movable portion 24 and the metal members 16 can be fastened together independently of the relative positional relation between the fixed portion 22 and the movable portion 24 in the height direction.

Further, in this embodiment, the metal members 16 are fastened in contact with the main body 14 in the directions except the height direction. Accordingly, when the metal members 16 are fastened to the main body 14 after the height of the tool 12 has been adjusted, strain due to fastening axial force does not occur in the height direction, thereby preventing the adjusted height of the tool 12 from unintentionally varying. In this way, the position adjustment device 10 of this embodiment is easy to use for the operator.

Fastening the metal members 16 to the main body 14 reinforces rigidity and damps vibrations occurring in the movable portion 24. In particular, the vibrations occurring in the movable portion 24 are damped more reliably, since the metal members 16 contain damping alloy in this embodiment. The vibrations occurring in the movable portion 24 are, for example, vibrations that occur when the tool 12 performs machining while being supported on the movable portion 24.

In this way, the position adjustment device 10 of this embodiment offers high rigidity and a superior vibration damping property.

The embodiment is not limited to the implementations above. For example, the operated portion 36 is not limited to a ball screw, as long as the operated portion 36 has the function of sliding the slide member 40 in the depth directions and the function of fixing the slide member 40 after sliding.

The side surface 22b of the fixed portion 22 and the side surface 24b of the movable portion 24 need not necessarily be substantially flush. The same applies to the side surface of the fixed portion 22 and the side surface of the movable portion 24 on the left-hand side, which are not graphically shown in this embodiment. The shape of the metal members 16 need not necessarily be a plate shape as long as the metal members 16 are shaped such that they can be fastened to the movable portion 24 and the fixed portion 22.

The metal members 16 need not necessarily be fastened to the side surfaces (22b, 24b) of the main body 14 that are spaced in the width direction, but may be fastened to the side surfaces of the main body 14 that are spaced in the depth direction.

The materials of the fixed portion 22, the movable portion 24, and the expanding and contracting portions 26 are not limited to the same alloy material. For example, the material of the fixed portion 22 and the material of the expanding and contracting portions 26 may differ from each other.

The description above has mentioned that the object to be supported by the position adjustment device 10 is not limited to the tool 12 of a machine tool. The position adjustment device 10 may support a workpiece that the machine tool machines with the tool 12. During machining, the workpiece being machined by the tool 12 may also vibrate. Supporting the workpiece with the position adjustment device 10 allows the height (vertical position) of the workpiece to be easily adjusted and also reliably damps vibrations of the workpiece being machined.

Applications

Figure 4:
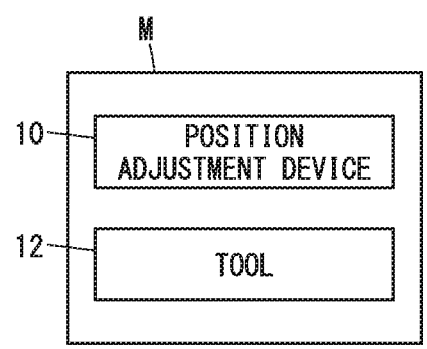
FIG. 4 is a block diagram of an ultraprecision machine tool having the position adjustment device.

FIG. 4 is a block diagram of an ultraprecision machine tool M including the position adjustment device 10.

The ultraprecision machine tool M is a machine tool for machining a workpiece with a very high degree of machining accuracy according to commands for performing machining of 100 nm (nanometers) or less. The ultraprecision machine tool M includes the tool 12 for machining the workpiece and the position adjustment device 10 supporting the tool 12 in a height adjustable manner. Though not shown in FIG. 4, the ultraprecision machine tool M further includes a driving device (e.g., a motor) for driving the tool 12, a control device for controlling the driving device, sensors, and the like.

The position adjustment device 10 of this embodiment is especially effective when it is applied to machine tools that are required to achieve very high machining precision, such as the ultraprecision machine tool M. That is, the tool 12 vibrates while the ultraprecision machine tool M performs machining. In machining based on commands for performing machining with 100 nm or less, the vibration will adversely affect the machining precision seriously even if the vibration is very small. However, the provision of the position adjustment device 10 having superior rigidity and damping property enables the ultraprecision machine tool M to easily maintain high machining precision.

The application has been described only by way of example. The position adjustment device 10 can be applied to any other machines having a tool 12, as well as to machine tools operating according to commands of 100 nm or less. Further, as mentioned above, the position adjustment device 10 may be used to support a workpiece to be machined by the ultraprecision machine tool M.

Modifications

The first embodiment has been described as an example of the present invention and the first embodiment can of course be modified or improved in various manners. It is clear from the recitation of claims that such modified or improved embodiments are also included in the technical scope of the invention.

Modification 1-1

Figure 5:
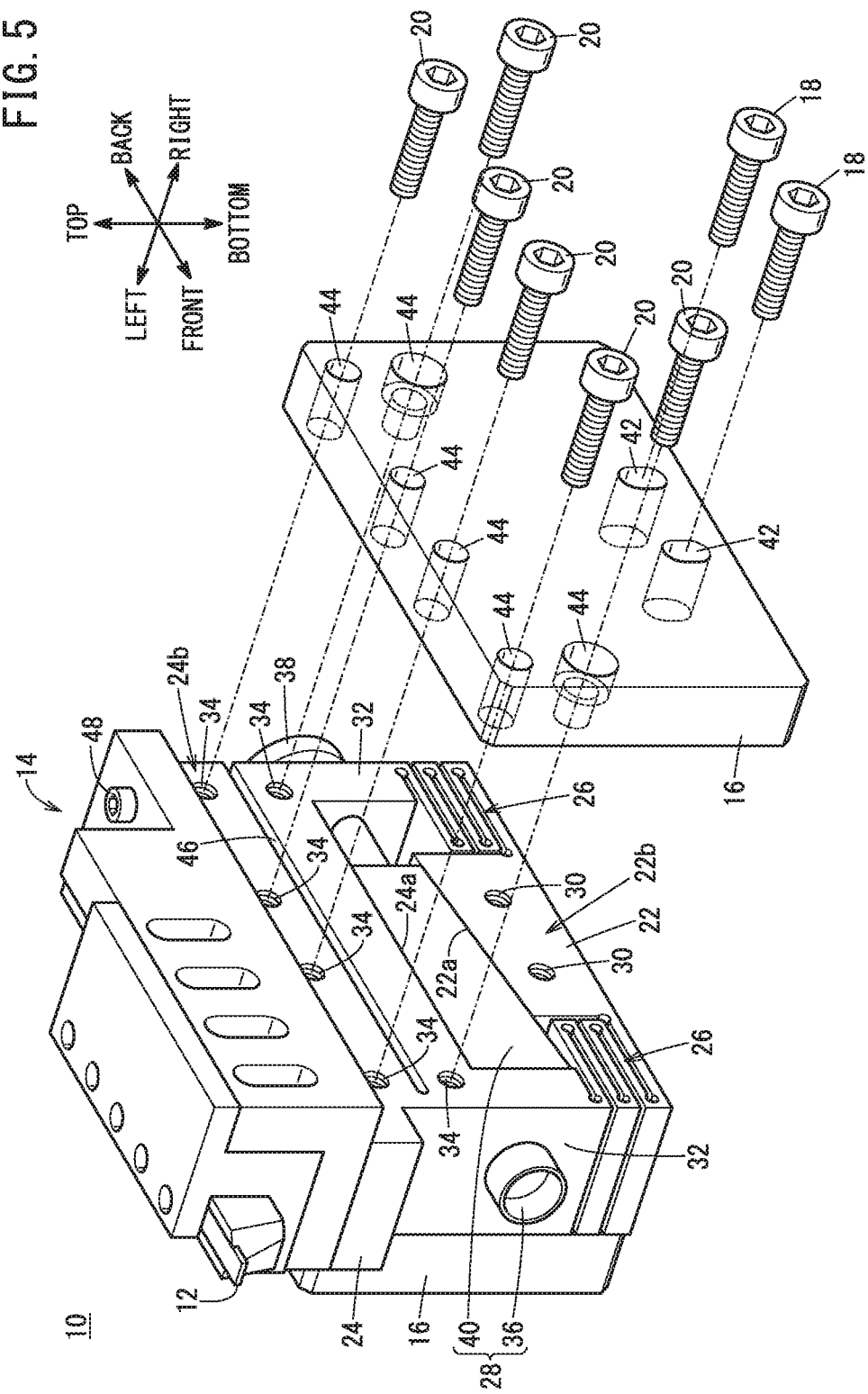
FIG. 5 is an exploded view of a position adjustment device according to a modification 1-1.
Figure 6:
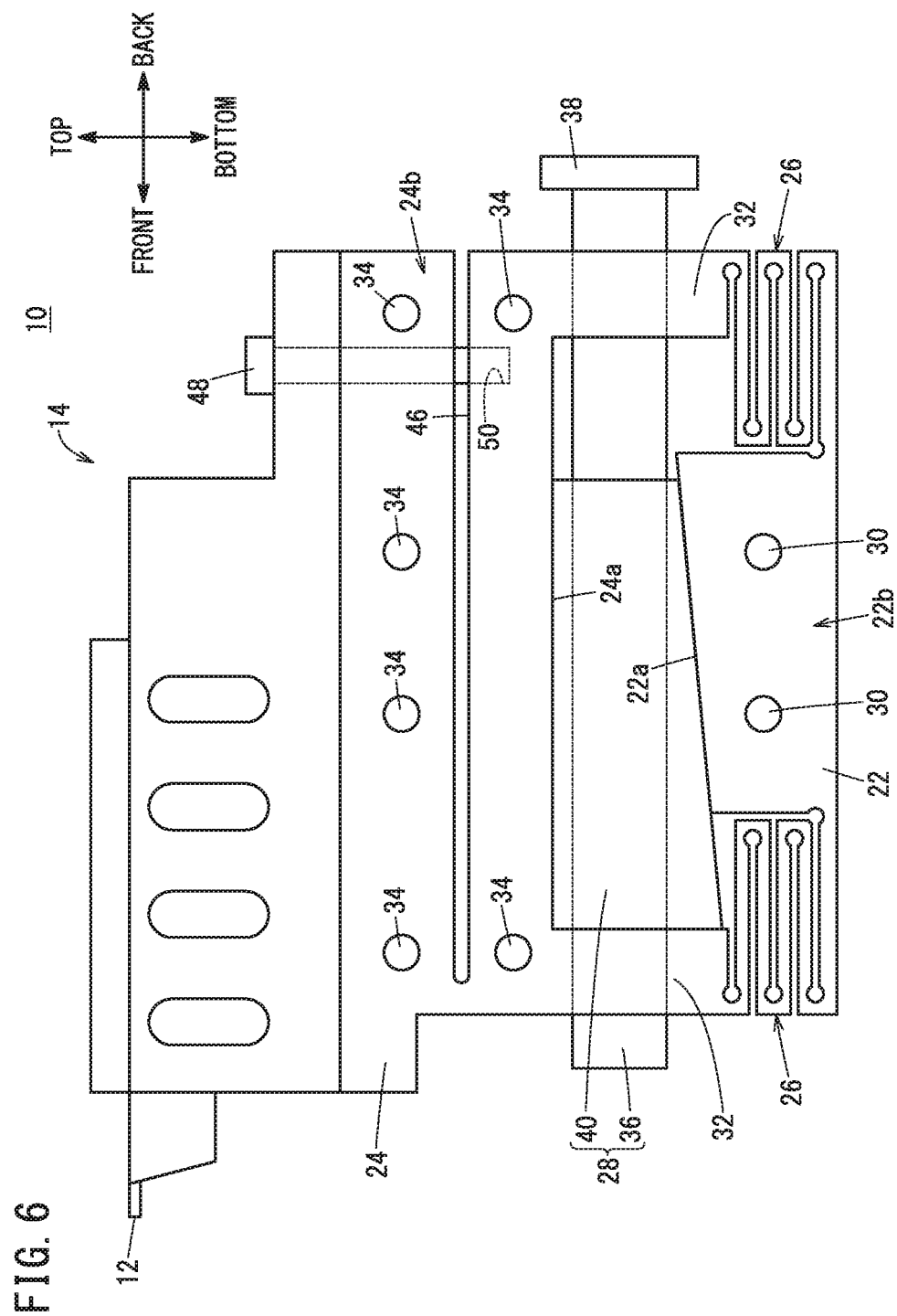
FIG. 6 is a side view of the main body of the position adjustment device of the modification 1-1.

FIG. 5 is an exploded view of a position adjustment device 10 according to a modification 1-1. FIG. 6 is a side view of the main body 14 of the position adjustment device 10 of the modification 1-1. FIG. 6 shows the main body 14 viewed from the right side.

The movable portion 24 may further include an inclination adjustment mechanism 46 for adjusting an inclination of the tool 12 being supported thereon. This allows the operator to adjust not only the height of the tool 12 but also an inclination of the tool 12.

The inclination adjustment mechanism 46 of this modification is a groove (hereinafter referred to as groove 46) that is formed in the movable portion 24 in a position below the tool 12 in the height direction. In this modification, as shown in FIG. 6, the upper part and lower part of the movable portion 24 sectioned by the groove 46 are connected to each other only at the front end of the movable portion 24.

The operator can easily adjust the inclination of the tool 12 by adjusting the inclination of a part of the movable portion 24 that is located above the groove 46, with the front end of the movable portion 24 serving as the fulcrum. The movable portion 24 further has formed therein a hole 48 that communicates with the groove 46 in the height direction. A fastening member 50 is inserted and fastened in the hole 48 to keep the inclination adjusted state.

While the inclination adjustment mechanism 46 illustrated above adjusts the inclination in the front-back direction, this modification can be further modified to adjust the inclination in the left-right direction.

Modification 1-2

The first embodiment has illustrated the first through holes 42 as elongated holes extending in the height direction. The position adjustment device 10 is not limited to this configuration but the second through holes 44 may be formed as elongated holes extending in the height direction. Further, both of the first through holes 42 and the second through holes 44 may be formed as elongated holes extending in the height direction. That is, in the position adjustment device 10, at least one of the first through holes 42 and the second through holes 44 may be formed as elongated holes extending in the height direction.

It is then possible to easily fasten the metal members 16 to the movable portion 24 and the fixed portion 22 even when the positional relation between the movable portion 24 and the fixed portion 22 varies in the height direction.

Modification 1-3

In the first embodiment, the metal members 16 are fixed on both sides of the main body 14 in the width direction. The structure of the position adjustment device 10 is not limited to this example but a metal member 16 may be fixed only on one side in the width direction of the main body 14.

The metal member 16 can damp vibrations occurring in the movable portion 24 even in implementations where the metal member 16 is fastened only on one side of the main body 14 in the width direction. It is thus possible to reduce the number of components in this modification.

Modification 1-4

The first embodiment has illustrated the configuration in which the metal members 16 are fastened to the main body 14. Means for fixing the metal members 16 to the main body 14 is not limited to fastening. For example, the metal members 16 may be fixed to the main body 14 by pressing the metal members 16 against the main body 14.

Means for pressing the metal members 16 against the main body 14 is not particularly limited. For example, a pressure may be applied to the metal member 16 in the direction toward the main body 14 using a piezoelectric device. A hydraulic press device may be used in place of a piezoelectric device. In this case, the pressure may be applied from both sides in the width direction of the main body 14 in order to prevent positional displacement of the main body 14 in the width direction, or the position of the main body 14 may be fixed using other fixing means.

Thus, as in the first embodiment, the position adjustment device 10 for the tool 12 having high rigidity and a superior vibration damping property is provided.

Modification 1-5

The first embodiment has illustrated a structure of the main body 14 in which the fixed portion 22 has the inclined surface 22a (see FIG. 3). The structure of the main body 14 is not limited to this implementation.

Figure 7:
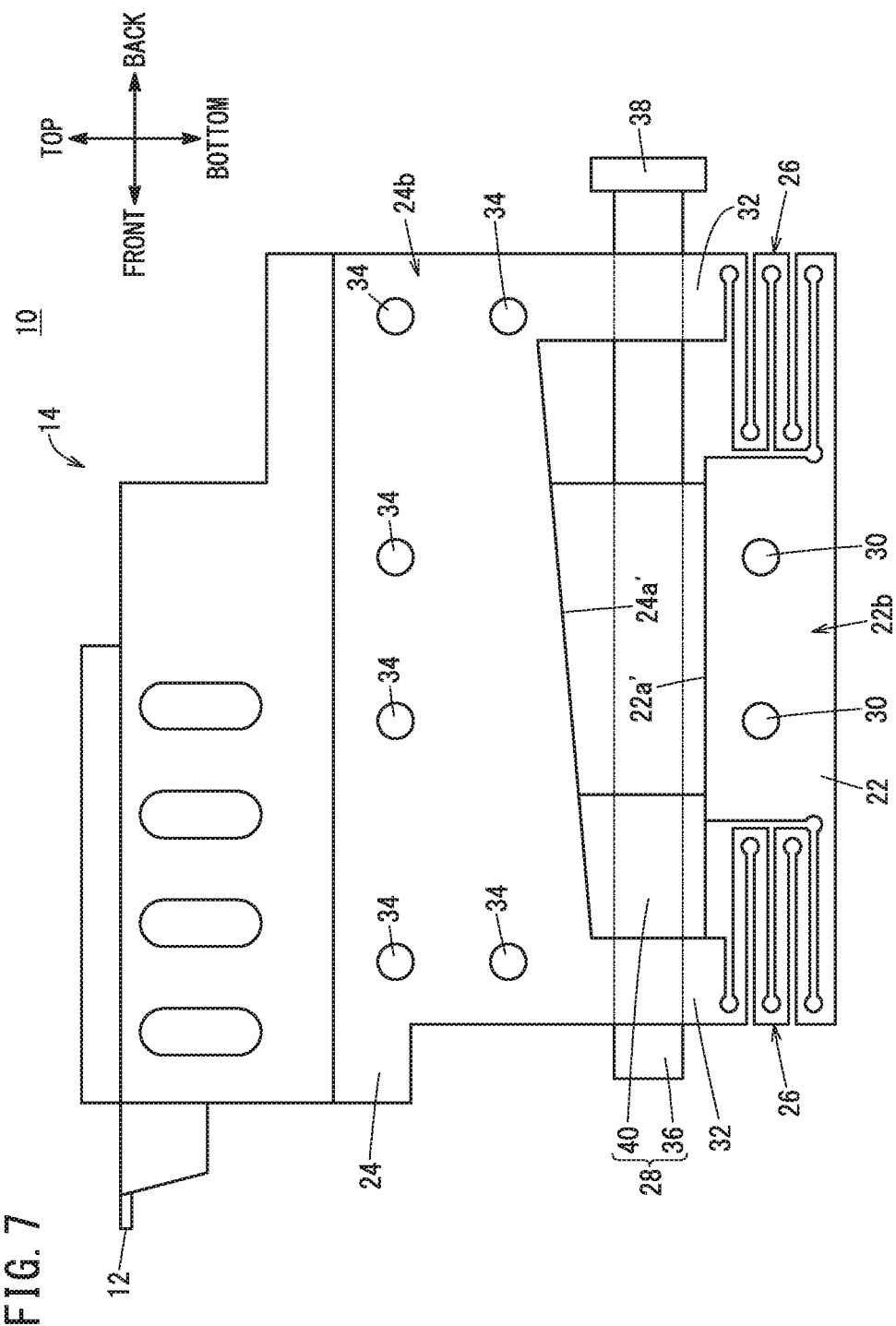
FIG. 7 is a side view of the main body of a position adjustment device according to a modification 1-5.

FIG. 7 is a side view of the main body 14 of a position adjustment device 10 according to a modification 1-5.

As shown in FIG. 7, the fixed portion 22 may have a top surface 22a' that is parallel with the front-back and left-right directions in place of the inclined surface 22a, with the movable portion 24 having an inclined surface 24a' that is inclined in the front-back direction.

The slide member 40 of this modification slides in the front-back directions along the inclined surface 24a'. As in the first embodiment, this slide motion is achieved by operating the operated portion 36. Also, as in the first embodiment, the movable portion 24 can be moved up and down as the slide member 40 slides.

Consequently, the operator can easily adjust the height (vertical position) of the tool 12 supported on the movable portion 24 also in cases where the main body 14 has the configuration of this modification.

Modification 1-6

The first embodiment and modifications can be suitably combined within a range in which no inconsistencies occur therein.

Second Embodiment

The position adjustment device according to a second embodiment will now be described below. Note that the components already explained in the first embodiment are labeled using the same names and same reference numerals and may not be explained here again.

Figure 8:
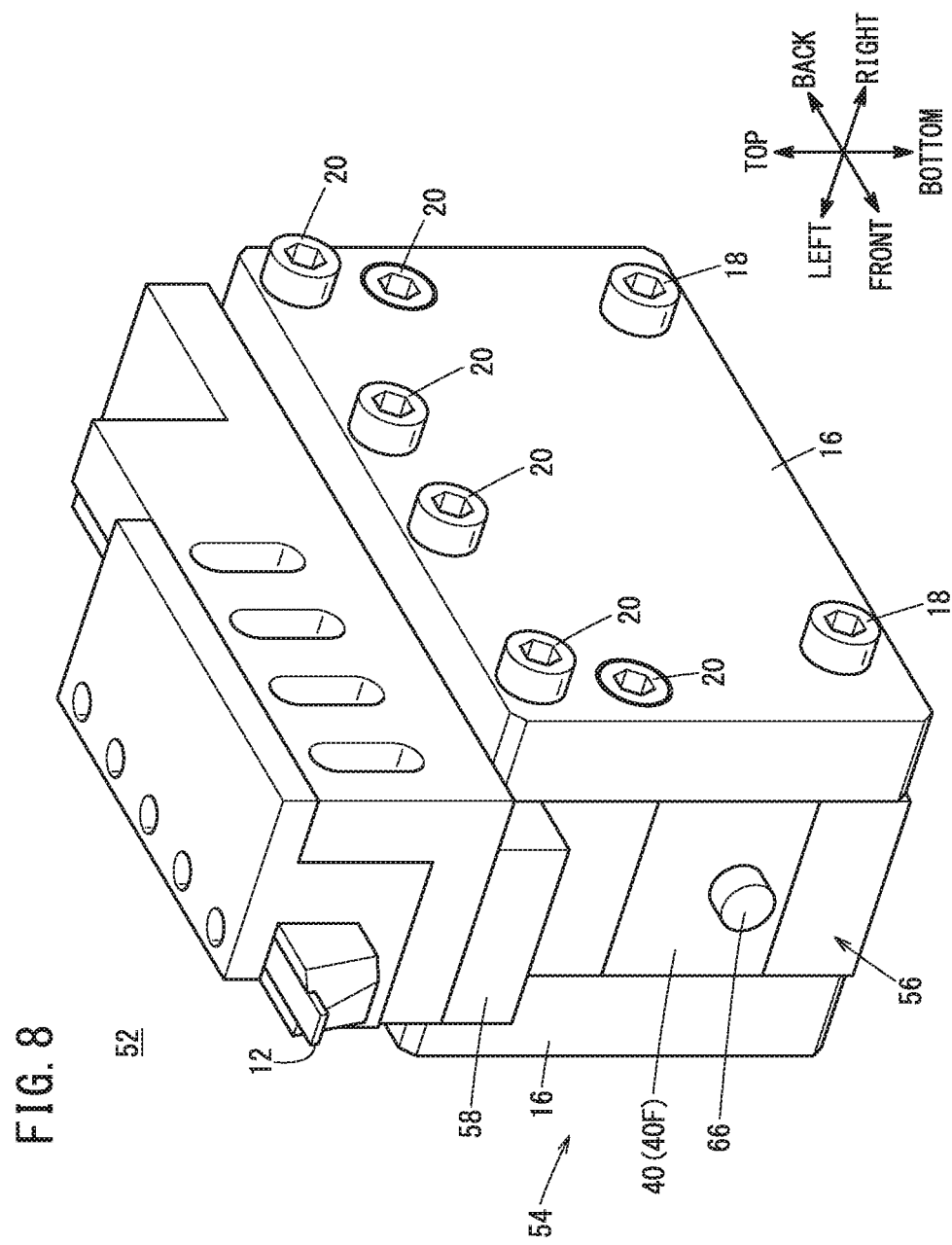
FIG. 8 is a perspective view of a position adjustment device according to a second embodiment.
Figure 9:
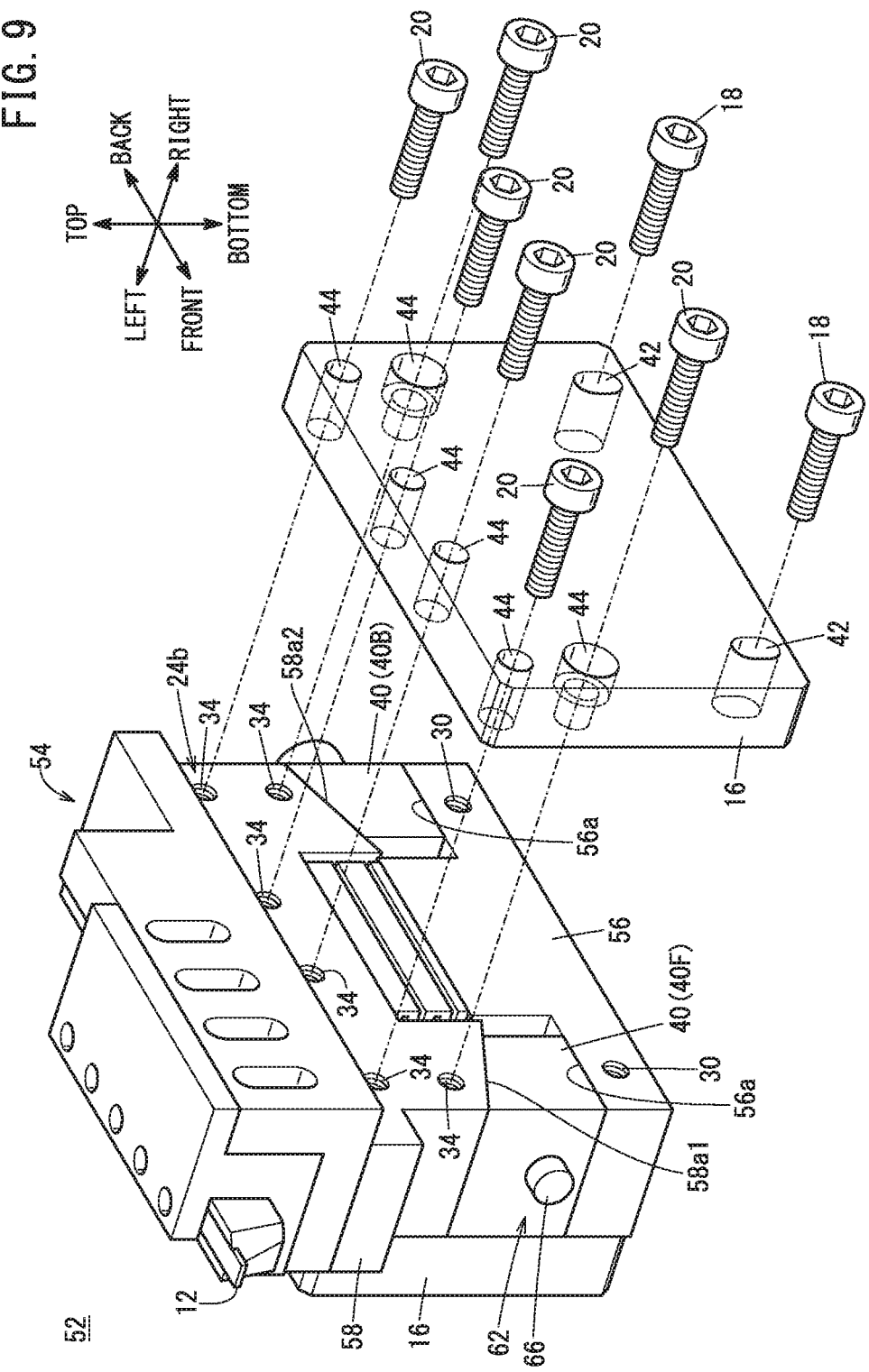
FIG. 9 is an exploded view of the position adjustment device of the second embodiment.

FIG. 8 is a perspective view of a position adjustment device 52 according to the second embodiment. FIG. 9 is an exploded view of the position adjustment device 52 of the second embodiment.

The position adjustment device 52 of this embodiment includes a main body 54, metal members 16, first fastening members 18, and second fastening members 20. Among these components, the metal members 16, the first fastening members 18, and the second fastening members 20 are the same components as those labeled with the same names and same reference numerals in the first embodiment or modifications 1-1 to 1-6.

Figure 10:
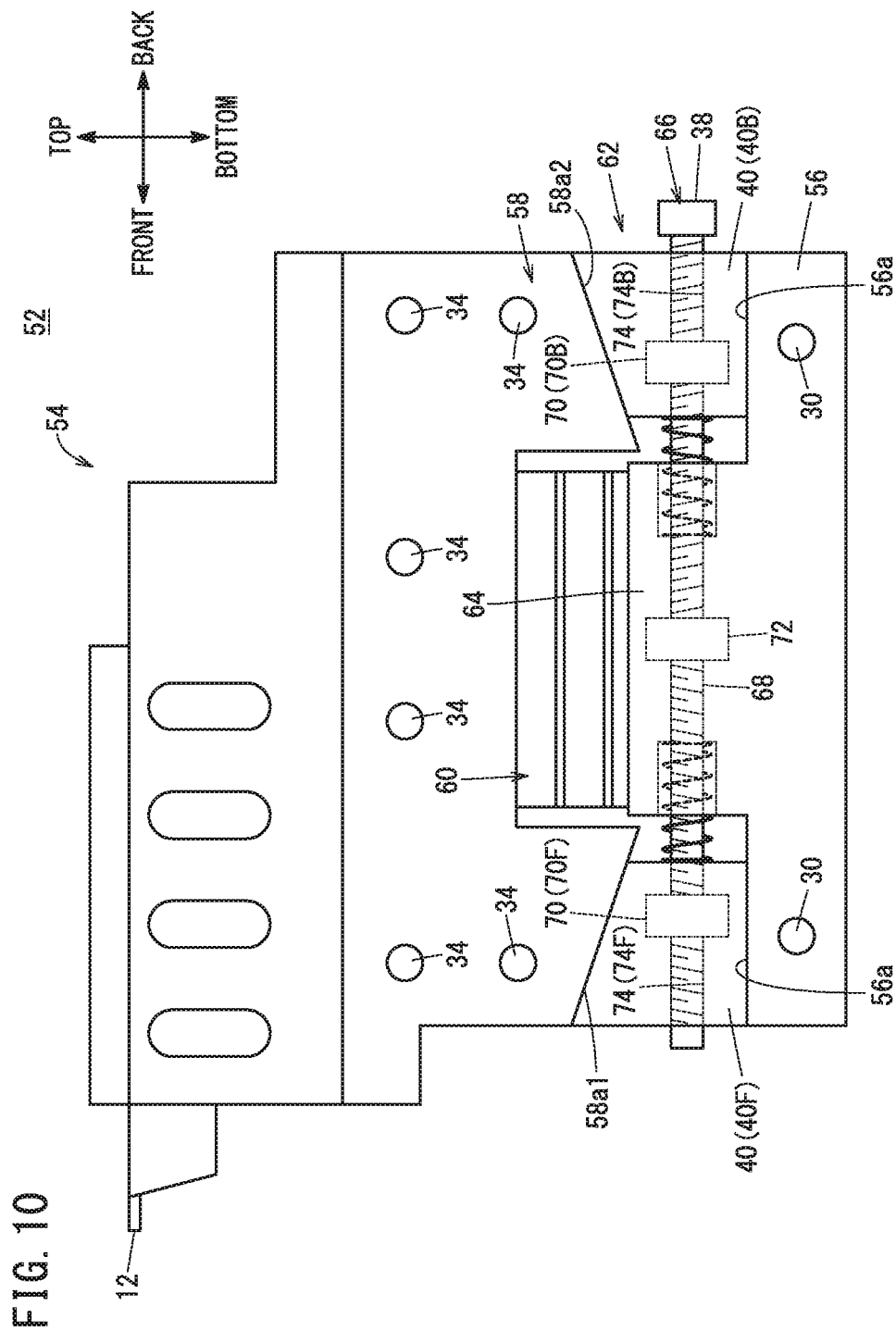
FIG. 10 is a side view of the main body of the position adjustment device of the second embodiment.

FIG. 10 is a side view of the main body 54 of the position adjustment device 52 of the second embodiment.

The structure of the main body 54 will be described. The main body 54 is used to support the tool 12. The main body 54 includes a fixed portion 56, a movable portion 58, an expanding and contracting portion 60, and an adjustment mechanism 62. The fixed portion 56 and the movable portion 58 are spaced from each other in the height direction, and the expanding and contracting portion 60 and the adjustment mechanism 62 are disposed between the fixed portion 56 and the movable portion 58.

The fixed portion 56 is placed on a worktable or floor, and provided on the lower side relative to the movable portion 58. The fixed portion 56 is made of an alloy material, for example.

The first insertion holes 30 that communicate with the first through holes 42 formed in the metal members 16 are formed in both side surfaces of the fixed portion 56 in the width direction (left-right direction). The first fastening members 18 are inserted respectively in the first through holes 42 and the first insertion holes 30 communicating with each other. The fixed portion 56 and the metal members 16 are thus coupled together.

The fixed portion 56 has a raised portion 64 that protrudes toward the movable portion 58 between a first slide member 40F and a second slide member 40B that will be described later. The fixed portion 56 has upper surfaces 56a extending on both sides of the raised portion 64 in the front-back direction. Each upper surface 56a extends in parallel with the front-back and left-right directions in this embodiment.

The movable portion 58 is provided to be movable in the height direction relative to the fixed portion 56 and serves to support the tool 12. The movable portion 58 is made of the same alloy material as the fixed portion 56, for example.

The movable portion 58 has, formed in both side surfaces thereof in the width direction, the second insertion holes 34 that communicate with the second through holes 44 formed in the metal members 16. The second fastening members 20 are inserted respectively in the second through holes 44 and second insertion holes 34 that communicate with each other. The movable portion 58 and the metal members 16 are thus coupled together.

The movable portion 58 has inclined surfaces 58a (58a1, 58a2) that are located on the side facing toward the fixed portion 56 and whose heights vary along the front-back direction. The inclined surfaces 58a include a first inclined surface 58a1 and a second inclined surface 58a2 that are arranged symmetrically in the front-back direction.

The first inclined surface 58a1 is located more frontward than the second inclined surface 58a2 and forms a surface of the movable portion 58 that becomes lower from the front side to back side in this embodiment. The second inclined surface 58a2 is a surface of the movable portion 58 that becomes lower from the back side to front side.

The expanding and contracting portion 60 couples the fixed portion 56 and the movable portion 58, and expands and contracts in the height directions. The expanding and contracting portion 60 of this embodiment is made of the same material as the fixed portion 56 and the movable portion 58, and has a crank shape that allows expansion and contraction thereof. However, note that the expanding and contracting portion 60 may be a spring having elasticity, like the expanding and contracting portions 26 of the same name described in the first embodiment.

The expanding and contracting portion 60 is disposed between the first inclined surface 58a1 and the second inclined surface 58a2 in the front-back direction. In this embodiment, the expanding and contracting portion 60 is coupled to the fixed portion 56 on the raised portion 64.

The adjustment mechanism 62 is a mechanism that allows the operator to suitably adjust the position of the movable portion 58 in the height direction relative to the fixed portion 56. The adjustment mechanism 62 includes an operated portion 66 and slide members 40.

Among these components, each slide member 40 is a wedge-shaped member as described in the first embodiment. However, note that, in this embodiment, as shown in FIG. 10, two slide members 40 are provided symmetrically in the front-back direction.

Hereinafter, the one of the two slide members 40 that is disposed on the front side will be referred to as first slide member 40F and the other one on the back side will be referred to as second slide member 40B. The first slide member 40F is disposed between the upper surface 56a of the fixed portion 56 and the first inclined surface 58a1 of the movable portion 58 and is in contact with them. The second slide member 40B is disposed between the upper surface 56a of the fixed portion 56 and the second inclined surface 58a2 of the movable portion 58 in contact with them.

The operated portion 66 is operated by the operator to cause the first slide member 40F and the second slide member 40B to simultaneously slide frontward and backward in a symmetrical manner. The operated portion 66 of this embodiment is a deflector type ball screw mechanism including a screw shaft 68 and nuts 70 screwed on the screw shaft 68.

The screw shaft 68 is a rod-shaped member having its axial direction extending in the front-back direction, and it passes through the first slide member 40F, the raised portion 64 of the fixed portion 56, and the second slide member 40B. The screw shaft 68 is supported by a bearing 72 provided in the raised portion 64. The bearing 72 allows the screw shaft 68 to turn, while restricting axial movement (positional displacement) of the screw shaft 68.

The screw shaft 68 has formed therein a first groove 74F and a second groove 74B. In a state that the screw shaft 68 is inserted into the raised portion 64, the first groove is located on the front side of the raised portion 64, while the second groove is located on the back side of the raised portion 64. The first groove 74F and the second groove 74B are both a screw groove (screw thread) formed to allow the nuts 70 to be screwed with the screw shaft 68, but they have different screw directions. For example, if the first groove 74F is a right-hand screw groove, then the second groove 74B is a reverse (left-hand) screw groove.

The nuts 70 include a first nut 70F and a second nut 70B. The first nut 70F is a nut 70 that screw-engages with the first groove 74F of the screw shaft 68. The second nut 70B is a nut 70 that screw-engages with the second groove 74B of the screw shaft 68.

The first nut 70F and the second nut 70B screwed on the screw shaft 68 both move frontward and backward as the screw shaft 68 turns. However, the directions in which the first nut 70F and the second nut 70B move as the screw shaft 68 turns are symmetrical relative to each other, since the screw direction of the first groove 74F and the screw direction of the second groove 74B are different from each other. For example, the first nut 70F moves frontward at the same time as the second nut 70B moves backward.

The first nut 70F is coupled to the first slide member 40F. The first slide member 40F thus slides as the first nut 70F moves in the front-back directions. The second nut 70B is coupled to the second slide member 40B. The second slide member 40B thus slides symmetrically relative to the first slide member 40F as the second nut 70B moves in the front-back directions.

The operator operates the operated portion 66 to cause the first slide member 40F and the second slide member 40B to slide simultaneously and symmetrically, so as to easily adjust the position of the movable portion 58 in the height direction. "Operating" here means operation for turning the screw shaft 68 of the operated portion 66.

As shown in FIG. 10, a handle (grip portion) 38 may be attached to the screw shaft 68. Alternatively, though not shown graphically, a hand-turned handle may be attached to the screw shaft 68. This allows the operator to easily operate the operated portion 66.

The description above has shown an exemplary configuration of the position adjustment device 52 of this embodiment. With the position adjustment device 52 described above, the operator can easily adjust the position of the tool 12 in the height direction, as with the position adjustment device 10 of the first embodiment.

Further, the metal members 16 are fixed to the main body 54 supporting the tool 12. Accordingly, the position adjustment device 52 of this embodiment provides high rigidity and a superior vibration damping property, like the position adjustment device 10 of the first embodiment.

Furthermore, in this embodiment, the first slide member 40F and the second slide member 40B are configured in such a manner that they slide symmetrically in the front-back directions. With this configuration, the frictional force occurring between the first slide member 40F and the first inclined surface 58a1 and the frictional force occurring between the second slide member 40B and the second inclined surface 58a2 oppose each other and cancel each other out. As a result, it is possible to reduce unintended attitude change and distortion of the movable portion 58 due to the frictional forces, and hence to reduce unintended attitude change of the tool 12 supported on the movable portion 58.

The position adjustment device 52 is especially effective when supporting the tool 12 of an ultraprecision machine tool M that performs machining according to commands for performing machining with a machining accuracy of 100 nm or less. That is, with an ultraprecision machine tool M required to achieve very fine machining accuracy of 100 nm or less, only a slight change in the attitude of the tool 12 results in significant variation in the quality of the completed products. However, the position adjustment device 52 can reliably prevents change in the attitude of the tool 12 of the ultraprecision machine tool M. It thus enables the ultraprecision machine tool M to achieve stable and excellent machining quality.

Similarly to the position adjustment device 10, the configuration of the position adjustment device 52 can be suitably modified within a range not departing from the essence and gist of the description above. Some specific examples thereof will be described below.

Modification 2-1

Figure 11:
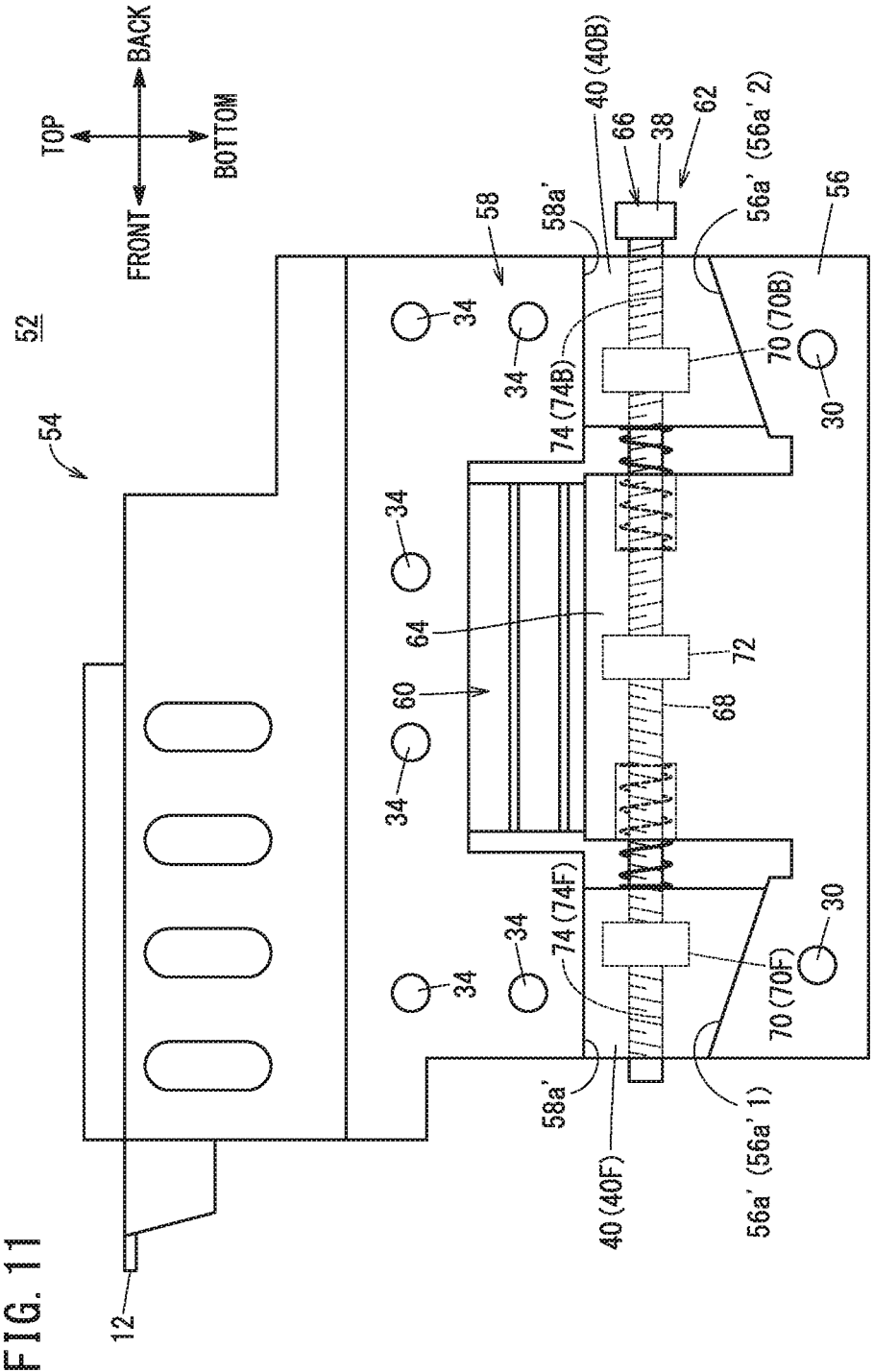
FIG. 11 is a side view of the main body of a position adjustment device according to a modification 2-1.

FIG. 11 is a side view of the main body 54 of a position adjustment device 52 according to a modification 2-1.

As shown in FIG. 11, the fixed portion 56 may have inclined surfaces 56a' that are formed on the front and back sides of the raised portion 64 at the side facing toward the movable portion 58, and the inclined surfaces 56a' are inclined symmetrically in the front-back direction. In this case, for example, the movable portion 58 has lower surfaces 58a' extending in parallel with the front-back and left-right directions, which form its surfaces located on the side facing toward the fixed portion 56 and lying in contact with the first slide member 40F and the second slide member 40B, respectively.

The two inclined surfaces 56a' of the fixed portion 56 of this modification will hereinafter be referred to as a third inclined surface 56a'1 and a fourth inclined surface 56a'2 so that they can be distinguished from the first inclined surface 58a1 and the second inclined surface 58a2. The third inclined surface 56a'1 is located on the front side of the raised portion 64 and the fourth inclined surface 56a'2 is located on the back side of the raised portion 64.

The third inclined surface 56a'1 and the fourth inclined surface 56a'2 are arranged symmetrically with each other in the front-back direction. In this modification, the third inclined surface 56a'1 becomes lower from the front side to back side. The fourth inclined surface 56a'2 becomes lower from the back side to front side.

With the position adjustment device 52 thus constructed, too, the operator can easily adjust the position of the movable portion 58 in the height direction by operating the operated portion 66.

Modification 2-2

Figure 12:
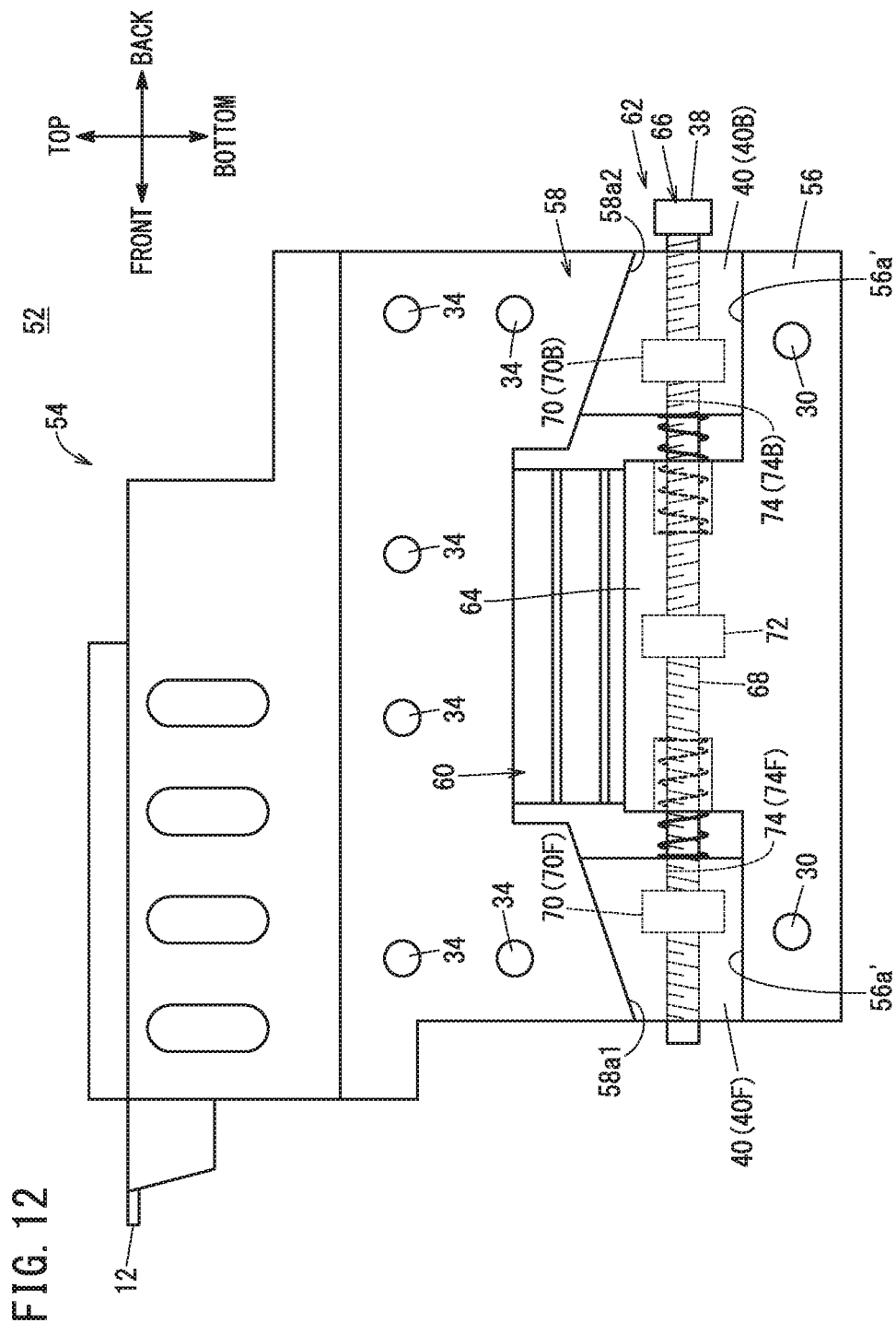
FIG. 12 is a side view of the main body of a position adjustment device according to a modification 2-2.

FIG. 12 is a side view of the main body 54 of a position adjustment device 52 according to a modification 2-2.

As shown in FIG. 12, the first inclined surface 58a1 may be formed so as to become lower from the back side to front side, and the second inclined surface 58a2 may be formed so as to become lower from the front side to back side.

Modification 2-3

Figure 13:
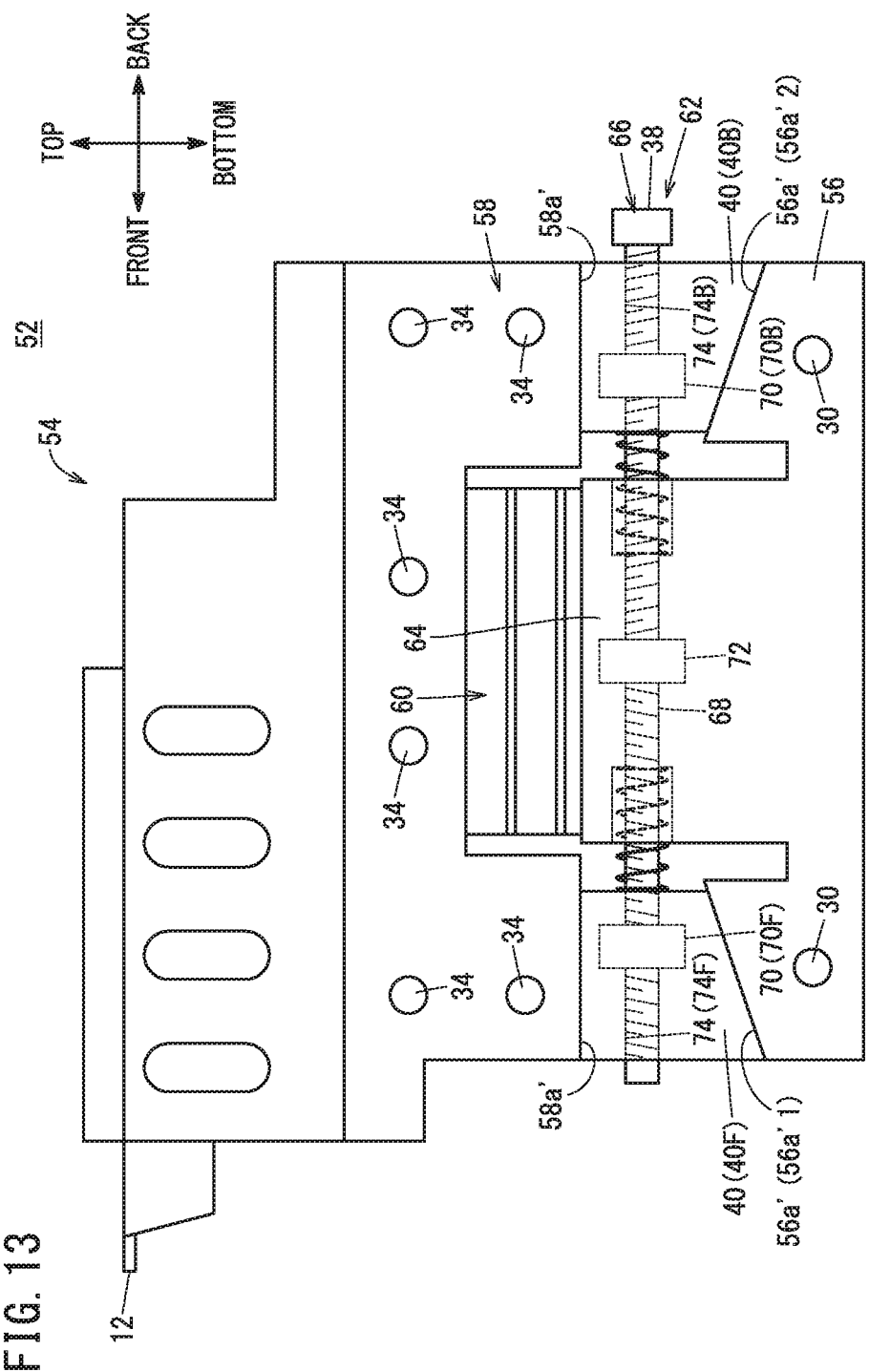
FIG. 13 is a side view of the main body of a position adjustment device according to a modification 2-3.

FIG. 13 is a side view of the main body 54 of a position adjustment device 52 according to a modification 2-3.

As shown in FIG. 13, the third inclined surface 56a'1 may be formed so as to become lower from the back side to front side, and the fourth inclined surface 56a'2 may be formed so as to become lower from the front side to back side.

Modification 2-4

The movable portion 58 may further include the inclination adjustment mechanism 46, like the movable portion 24.

Invention Obtained from Embodiments

The invention graspable from the embodiments and modifications will be recited below.

First Invention

A position adjustment device (10, 52) for adjusting a height of an object to be supported (12) that is being supported includes: a fixed portion (22, 56); a movable portion (24, 58) provided to be movable in the height direction relative to the fixed portion (22, 56) and configured to support the object to be supported (12); an expanding and contracting portion (26, 60) coupled to the fixed portion (22, 56) and the movable portion (24, 58) and configured to expand and contract in the height direction; an adjustment mechanism (28, 62) configured to adjust a position of the movable portion (24, 58) in the height direction relative to the fixed portion (22, 56); and a metal member (16) fixed to the fixed portion (22, 56) and the movable portion (24, 58).

The above configuration provides a position adjustment device (10, 52) which has high rigidity and a superior vibration damping property. The object to be supported (12) is not particularly limited and can be, for example, a tool of a machine tool or a workpiece thereof.

The metal member (16) may include a damping alloy as a material thereof. It is then possible to more reliably damp vibrations occurring in the movable portion (24, 58).

The metal member (16) may have formed therein a first through hole (42) and a second through hole (44), and at least one of the first through hole (42) and the second through hole (44) may be an elongated hole penetrating through the metal member in a direction orthogonal to the height direction and extending along the height direction. The fixed portion (22, 56) may have formed therein a first insertion hole (30) that communicates with the first through hole (42), and the movable portion (24, 58) may have formed therein a second insertion hole (34) that communicates with the second through hole (44) when the first through hole (42) and the first insertion hole (30) communicate with each other. Then, the position adjustment device (10, 52) may further include a first fastening member (18) inserted in the first through hole (42) and the first insertion hole (30) so as to fasten the fixed portion (22, 56) and the metal member (16) together, and a second fastening member (20) inserted in the second through hole (44) and the second insertion hole (34) so as to fasten the movable portion (24, 58) and the metal member (16) together. With this configuration, it is possible to easily fasten the metal member (16) to the movable portion (24, 58) and the fixed portion (22, 56) even if the positional relation between the movable portion (24, 58) and the fixed portion (22, 56) varies in the height direction.

The expanding and contracting portion (26, 60) may be a spring. A position adjustment device (10, 52) having high rigidity and a superior vibration damping property is thus provided.

The fixed portion (22, 56) and the movable portion (24, 58) may be spaced from each other in the height direction, the adjustment mechanism (28, 62) may be provided between the movable portion (24, 58) and the fixed portion (22, 56), and the expanding and contracting portion (26, 60) may be provided on a side of the fixed portion (22, 56). A position adjustment device (10, 52) having high rigidity and a superior vibration damping property is thus provided.

The fixed portion (22, 56) and the movable portion (24, 58) may be spaced from each other in the height direction, and the adjustment mechanism (28, 62) may include a wedge-shaped slide member (40) being in contact with the movable portion (24, 58) and the fixed portion (22, 56), and an operated portion (36) configured to be operated to cause the slide member (40) to slide along a slide direction that is orthogonal to the height direction. One of the movable portion (24, 58) and the fixed portion (22, 56) may have an inclined surface (22a, 24a', 56a', 58a) that is a surface in contact with the slide member (40) and whose height varies along the slide direction. Thus, the height of the movable portion (24, 58) relative to the fixed portion (22, 56) can be easily adjusted by operating the operated portion (36).

The expanding and contracting portion (26) may include expanding and contracting portions (26) disposed respectively on both sides of the fixed portion (22) in the slide direction. Thus, the attitude of the movable portion (24) can be kept more stable since the two expanding and contracting portions (26) uniformly expand and contract in the height direction as the slide member (40) slides.

The slide member (40) may be provided between the expanding and contracting portions (26) disposed respectively on both sides of the fixed portion (22) in the slide direction. Thus, the position adjustment device (10) can be constructed compactly, for example.

The slide member (40) may include a first slide member (40F) and a second slide member (40B) that are disposed symmetrically with each other in the slide direction, and the first and second slide members (40F, 40B) may slide symmetrically with each other in the slide direction as the operated portion (66) is operated. The inclined surface (56a', 58a) may include a first inclined surface (56a'1, 58a1) being in contact with the first slide member (40F) and a second inclined surface (56a'2, 58a2) being in contact with the second slide member (40B) and inclined symmetrically with the first inclined surface (56a'1, 58a1) in the slide direction. Thus, the attitude of the movable portion (58) can be kept more stable since the first slide member (40F) and the second slide member (40B) slide symmetrically with each other.

The expanding and contracting portion (60) may be disposed between the first slide member (40F) and the second slide member (40B). Thus, the position adjustment device (52) can be constructed compactly, for example.

The movable portion (24, 58) may further include an inclination adjustment mechanism (46) configured to adjust an inclination of the object to be supported (12) that is being supported. It is thus possible to adjust not only the height of the object to be supported (12) but also the inclination of the object to be supported (12).

Second Invention

An ultraprecision machine tool (M) configured to machine a workpiece according to a command for performing machining of 100 nm or less includes the position adjustment device (10, 52) according to <First Invention>.

Thus, an ultraprecision machine tool (M) having high rigidity and a superior vibration damping property is provided. Further, the ultraprecision machine tool (M) can maintain excellent machining accuracy easily.

What is claimed is:

1. A position adjustment device for adjusting a height of an object to be supported, comprising:
    a fixed portion;
    a movable portion provided to be movable in a height direction relative to the fixed portion and configured to support the object to be supported;
    an expanding and contracting portion coupled to the fixed portion and the movable portion and configured to expand and contract in the height direction;
    an adjustment mechanism configured to adjust a position of the movable portion in the height direction relative to the fixed portion; and
    a metal member comprising a first through hole for a first fastening member to fix the metal member to the fixed portion, and a second through hole for a second fastening member to movably attach the metal member to the movable portion, wherein at least one of the first or second through holes is an elongated hole.

2. The position adjustment device according to claim 1, wherein the metal member includes a damping alloy as a material thereof.

3. The position adjustment device according to claim 1, wherein the elongated hole penetrates through the metal member in a direction orthogonal to the height direction and extends along the height direction,
    the fixed portion has formed therein a first insertion hole that communicates with the first through hole, and
    the movable portion has formed therein a second insertion hole that communicates with the second through hole when the first through hole and the first insertion hole communicate with each other.

4. The position adjustment device according to claim 1, wherein the expanding and contracting portion is a spring.

5. The position adjustment device according to claim 1, wherein
    the fixed portion and the movable portion are spaced from each other in the height direction,
    the adjustment mechanism is provided between the movable portion and the fixed portion, and
    the expanding and contracting portion is provided on a side of the fixed portion.

6. The position adjustment device according to claim 1, wherein
    the fixed portion and the movable portion are spaced from each other in the height direction,
    the adjustment mechanism includes a wedge-shaped slide member being in contact with the movable portion and the fixed portion, and an operated portion configured to be operated to cause the slide member to slide along a slide direction that is orthogonal to the height direction, and
    one of the movable portion and the fixed portion has an inclined surface that is a surface in contact with the slide member and whose height varies along the slide direction.

7. The position adjustment device according to claim 6, wherein the expanding and contracting portion comprises expanding and contracting portions disposed respectively on both sides of the fixed portion in the slide direction.

8. The position adjustment device according to claim 7, wherein the slide member is provided between the expanding and contracting portions disposed respectively on both sides of the fixed portion in the slide direction.

9. The position adjustment device according to claim 6, wherein
    the slide member comprises a first slide member and a second slide member that are disposed symmetrically with each other in the slide direction, the first and second slide members being configured to slide symmetrically with each other in the slide direction as the operated portion is operated, and
    the inclined surface comprises a first inclined surface being in contact with the first slide member and a second inclined surface being in contact with the second slide member and inclined symmetrically with the first inclined surface in the slide direction.

10. The position adjustment device according to claim 9, wherein the expanding and contracting portion is disposed between the first slide member and the second slide member.

11. The position adjustment device according to claim 1, wherein the movable portion further includes an inclination adjustment mechanism configured to adjust an inclination of the object to be supported that is being supported.

12. An ultraprecision machine tool configured to machine a workpiece according to a command for performing machining of 100 nm or less, the ultraprecision machine tool comprising the position adjustment device according to claim 1.

* * * * *